(12) United States Patent
Hynes et al.

(10) Patent No.: US 9,060,072 B2
(45) Date of Patent: Jun. 16, 2015

(54) METHOD FOR LIMITING THE USE OF A MOBILE COMMUNICATIONS DEVICE

(75) Inventors: Ciaran Hynes, Mount Merrion (IE); Brendan McKenna, Kildare (IE)

(73) Assignee: Cirian Hynes, Beverly, MA (US)

( * ) Notice: Subject to any disclaimer, the term of this patent is extended or adjusted under 35 U.S.C. 154(b) by 167 days.

(21) Appl. No.: 13/331,256

(22) Filed: Dec. 20, 2011

(65) Prior Publication Data

US 2012/0289214 A1    Nov. 15, 2012

(30) Foreign Application Priority Data

May 11, 2011 (EP) ..................................... 11165758

(51) Int. Cl.
| | |
|---|---|
| *H04M 11/00* | (2006.01) |
| *H04W 36/00* | (2009.01) |
| *H04W 40/00* | (2009.01) |
| *H04W 24/00* | (2009.01) |
| *H04M 1/00* | (2006.01) |
| *H04M 1/725* | (2006.01) |
| *H04M 1/67* | (2006.01) |

(52) U.S. Cl.
CPC ............ *H04M 1/72577* (2013.01); *H04M 1/67* (2013.01); *H04M 2250/10* (2013.01)

(58) Field of Classification Search
CPC ...................... H04M 1/72519; H04M 1/72583; H04M 1/72522; H04M 2215/32; H04M 15/00; H04W 4/24; G01P 1/11; G01P 1/103; B60Q 1/54
USPC ...................... 455/566, 406, 441, 445, 456.1; 340/466, 670; 342/357.1, 357.22
See application file for complete search history.

(56) References Cited

U.S. PATENT DOCUMENTS

| | | |
|---|---|---|
| 4,989,230 A | 1/1991 | Gillig et al. |
| 5,301,227 A | 4/1994 | Kamei et al. |
| 5,917,430 A | 6/1999 | Greneker, III et al. |
| 6,154,658 A | 11/2000 | Caci |
| 6,188,315 B1 | 2/2001 | Herbert et al. |
| 6,263,190 B1 | 7/2001 | Mamori et al. |
| 6,341,228 B1 * | 1/2002 | Hubbe et al. .................. 455/566 |
| 6,353,778 B1 | 3/2002 | Brown |
| 6,421,538 B1 | 7/2002 | Byrne |

(Continued)

FOREIGN PATENT DOCUMENTS

| | | |
|---|---|---|
| EP | 0660627 A3 | 1/1997 |
| EP | 0833293 A1 | 4/1998 |

(Continued)

OTHER PUBLICATIONS

European Patent Office (EPO), EP Search Report dated Nov. 26, 2010 in corresponding EP Appl. No. 10158 254.2 (2 pages).

(Continued)

*Primary Examiner* — William D Cumming
(74) *Attorney, Agent, or Firm* — Gesmer Updegrove LLP

(57) ABSTRACT

A method for limiting the use of a mobile communications device is disclosed. The mobile communications device includes a user interface. The method includes determining the physical speed at which the mobile communications device is travelling. The method includes comparing the physical speed to a preset threshold speed. The method includes limiting the functionality of the mobile communications device if the physical speed thereof is above preset threshold speed.

12 Claims, 2 Drawing Sheets

(56) References Cited

U.S. PATENT DOCUMENTS

Figure 1:
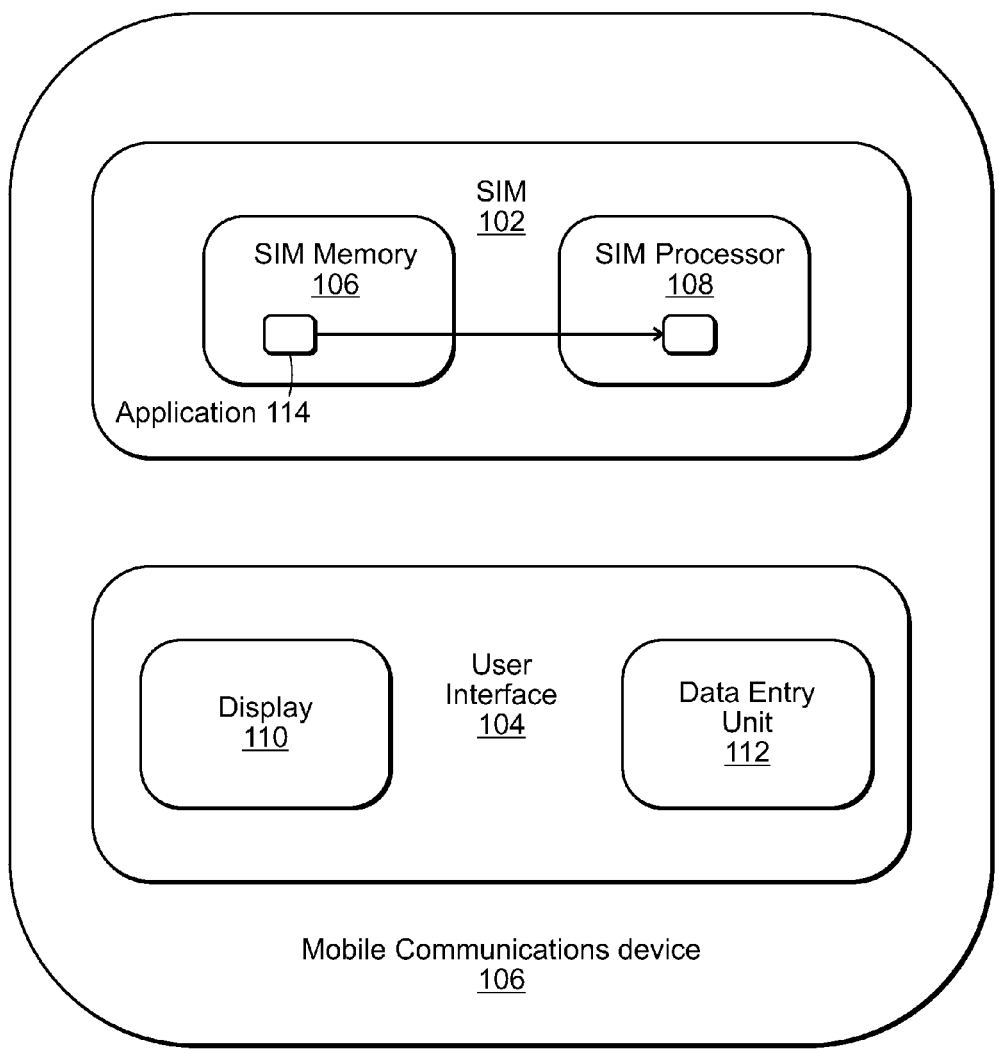

| | | | |
|---|---|---|---|
| 6,424,888 B1 | 7/2002 | Sone et al. | |
| 6,556,185 B2 | 4/2003 | Rekimoto | |
| 6,647,328 B2 | 11/2003 | Walker | |
| 6,690,292 B1 | 2/2004 | Meadows et al. | |
| 6,728,542 B2* | 4/2004 | Meda | 455/445 |
| 6,738,630 B2 | 5/2004 | Ashmore | |
| 6,782,240 B1 | 8/2004 | Tabe | |
| 6,845,316 B2 | 1/2005 | Yates | |
| 6,892,116 B2 | 5/2005 | Geisler et al. | |
| 6,934,552 B2 | 8/2005 | Holley et al. | |
| 6,974,414 B2 | 12/2005 | Victor | |
| 7,050,834 B2 | 5/2006 | Harwood et al. | |
| 7,239,871 B2 | 7/2007 | Shamp et al. | |
| 7,505,784 B2 | 3/2009 | Barbera | |
| 7,791,534 B1* | 9/2010 | Zhi et al. | 342/357.22 |
| 8,217,800 B2 | 7/2012 | Vander Veen et al. | |
| 8,295,804 B2* | 10/2012 | Bosan et al. | 455/406 |
| 2002/0168981 A1* | 11/2002 | Meda | 455/441 |
| 2003/0024310 A1 | 2/2003 | Montagnon | |
| 2004/0094926 A1 | 5/2004 | Engels et al. | |
| 2005/0239479 A1* | 10/2005 | Bednasz | 455/456.1 |
| 2007/0026871 A1* | 2/2007 | Wager | 455/456.1 |
| 2007/0072553 A1 | 3/2007 | Barbera | |
| 2007/0254632 A1 | 11/2007 | Beadle et al. | |
| 2008/0064446 A1 | 3/2008 | Camp et al. | |
| 2008/0102479 A1 | 5/2008 | Merza | |
| 2009/0002147 A1* | 1/2009 | Bloebaum et al. | 340/466 |
| 2009/0012522 A1 | 1/2009 | Lob | |
| 2009/0085801 A1* | 4/2009 | Sengupta et al. | 342/357.1 |
| 2009/0149168 A1 | 6/2009 | McLean | |
| 2009/0163243 A1 | 6/2009 | Barbera | |
| 2009/0215466 A1 | 8/2009 | Ahl et al. | |
| 2009/0224931 A1* | 9/2009 | Dietz et al. | 340/670 |
| 2010/0035588 A1 | 2/2010 | Adler et al. | |
| 2010/0062754 A1 | 3/2010 | Allen et al. | |
| 2010/0113073 A1 | 5/2010 | Schlesener et al. | |
| 2011/0028139 A1 | 2/2011 | Odom | |
| 2011/0039572 A1 | 2/2011 | Lamb et al. | |
| 2011/0077032 A1 | 3/2011 | Correale et al. | |
| 2011/0136509 A1 | 6/2011 | Osann, Jr. | |
| 2012/0071151 A1 | 3/2012 | Abramson et al. | |

FOREIGN PATENT DOCUMENTS

| | | |
|---|---|---|
| EP | 2523434 A1 | 11/2012 |
| KR | 20030024310 A | 3/2003 |
| KR | 20040094926 A | 11/2004 |
| KR | 20080102479 A | 11/2008 |
| WO | WO 2009-012522 A1 | 1/2009 |
| WO | WO 2010-062754 A1 | 3/2010 |
| WO | WO2011019900 A2 | 2/2011 |

OTHER PUBLICATIONS

KIPO (ISA/KR), PCT International Search Report, Written Opinion and Notification of Transmittal of Same from the ISA in PCT/US2010/045302 (Drive Safely Corporation et al.) mailed Feb. 24, 2011 (total 8 pages).

Protalinski, Emil, "Gemalto creates SIM card that brings Facebook to feature phones", article found at http://www.zdnet.com/blog/facebook/gemalto-creates-sim-card-that-brin . . . Article dated Feb. 14, 2011. Article printed on Jul. 25, 2012) total 1 page.

Cohen, Jackie, "First Facebook SIM Card Released", article found at http://allfacebook.com/first-facebook-sim-card-released_b32504. Article dated Feb. 14, 2011. Article printed on Jul. 25, 2012) Total 2 pages.

Selleck, Evan, "Facebook application added to SIM card thanks to Gemalto", article found at http://www.phonedog.com/2011/02/14/facebook-application-added-to-si . . . Article dated Feb. 14, 2011. Article printed on Jul. 25, 2012. (total 6 pages).

"Digital Cellular Telecommunications System (Phase 2+); Specification of the SIM Application Toolkit for the Subscriber Identity Module—Mobile Equipment (SIM-ME) interface (GSM 11.14 version 8.2.1, Release 1999", 3GPP Standard; GSM 11.14, 3rd Generation Partnership Project (3GPP), Mobile Competence Centre; 650, Route Des Lucioles; F-06921 Sophia-Antipolis Cedex; France, No. V8.2.1, May 1, 2000, pp. 1-132, XP050359922, *the whole document*.

"3rd Generation Partnership Project; Technical Specification Group Core Network and Terminals; (US) SIM Application Programming Interface (API); (U) SIM API for Java Å Card (Release 9)" 3GPP Standard; 3GPP TS 31.130, 3rd Generation Partnership Project (3GPP), Mobile Competence Centre; 650, Route Des Lucioles ; F-06921 Sophia-Antipolis Cedex; France, No. V9.1.1., Jun. 20, 2010, pp. 1-19, XP050441955, [retrieved on Jun. 10, 2010] *the whole document*.

Java Card (TM) & STK Applet Development Guidelines, Dec. 1, 2009, pp. 1-53 XP5509986, Retrieved from the Internet: URL: http://develop0er.gemalto.com/fileadmin/contrib/downloads/pdf/Java Card & STK Applet Development Guidelines.pdf; printed and retrieved on Oct. 19, 2011 and Jun. 20, 2012.

European Patent Office, EP Search Report of corresponding EP Patent Application No. EP11165758.1-2414 dated Oct. 31, 2011, (total 9 pages).

Business Wire: ZoomSafer Acquires Important Safe Driving Technology Patent (http://www.allbusiness.com/company-activities-management/ . . . (2 pages), Jul. 1, 2009.

Wheeler, B., "Here's how to stop texting and driving", found at http://www.app.com/apps/pbcs.dll . . . (1 Page), Aug. 5, 2009.

* cited by examiner

METHOD FOR LIMITING THE USE OF A MOBILE COMMUNICATIONS DEVICE

INTRODUCTION

The present invention relates to a method for limiting the use of a mobile communications device. In particular, it relates to a method for limiting the use of a mobile communications device, the mobile communications device comprising a user interface, the steps of the method comprising determining the physical speed at which the mobile communications device is travelling; comparing the physical speed to a preset threshold speed; and limiting the functionality of the mobile communications device if the physical speed thereof is above preset threshold speed.

It is widely known that the use of mobile communications devices to make phone calls while driving can lead to erratic, careless and dangerous driving. Many jurisdictions have forbidden the use of mobile phones by a driver. Some bans totally forbid use, while others forbid the use of handheld mobile phones, thereby allowing the use of 'hands-free' kits to engage in phone calls. However, as well as the ability to make phone calls, mobile phones also possess messaging technology, while more modern cell phones posses the ability to browse the internet. Compared to phone calls, messaging, including text message and emailing, and internet browsing require the user to read from the phone's display. If that user is driving at the same time, the user must be distracted from the road and his mirrors. Furthermore, if a user is entering data into the phone, for example creating an outgoing message, or navigating a website, this will often require him to take at least one hand off the steering wheel and to take his gaze from the road. It is therefore acknowledged that it is very dangerous to engage in messaging or the like while driving. But, even though there is acknowledged danger, it can still be very tempting for a user to engage in such practices.

A number of systems have been proposed to deter or prevent drivers from using their phones while driving. Such systems may often be installed on the phones of minors or employees to ensure safe driving in a parent's or employer's car. Such installations are based on the assumption that the driver cannot necessarily be trusted to obey the rules with regard to phone usage while driving. Alternatively, a user may know that he himself cannot be trusted to obey the rules all the time, and installs a usage deterrent system on his phone. European Patent No. 1 916 854 describes a system whereby the speed at which the phone is moving is calculated and features of the phone are disabled if the phone is travelling above a certain speed. The system provides for an override to be used if the user is not driving, but is a passenger, in a car or train for example. A problem with such a system is that a driver may simply choose to implement the override if he is determined to make use of the phone while driving. Other systems have been disclosed wherein some form of technology is used to determine that the user is also the driver. US Patent Application Publication No. 2011/0039581 discloses a system whereby the phone communicates with the steering wheel of a vehicle via RFID technology. In this way, if the phone is too near the steering wheel, it is determined that the user is the driver. This is a complex system—it requires the installation of hardware in the car, and is therefore tied to that particular car.

It is an object therefore of the present invention to provide a method for limiting the use of a mobile communications device that overcomes at least some of the above-mentioned problems.

SUMMARY

According to the invention there is provided a method for limiting the use of a mobile communications device, the mobile communications device comprising a user interface, the steps of the method comprising determining the physical speed at which the mobile communications device is travelling; comparing the physical speed to a preset threshold speed; limiting the functionality of the mobile communications device if the physical speed thereof is above preset threshold speed; characterized in that the mobile communications device comprises a Subscriber Identity Module (SIM); and the steps of the method are carried out by a SIM Application Tool Kit (SAT) application running on the SIM.

In this way, the method of the invention can detect a phone moving at a speed indicating presence in a vehicle and then limit the phone's functionality in a manner that is completely inaccessible to the user, as the user of a mobile communications device has no access to SAT applications running on the SIM, other than the access defined by that application. The SIM is the most secure part of the phone, therefore implementing the method of the invention as an SAT application prevents the user from over-riding the method of the invention so as to regain full functionality of the mobile communications device. This prevents users who are unwilling to limit usage of their phone while driving from seeking over-rides to a usage-limiting method.

In one embodiment of the invention there is provided a method in which the method comprises the additional steps of presenting an attention verification test to a user via the user interface; receiving a user response to the attention verification test via the user interface; restoring the functionality of the mobile communications device if an appropriate user response is received. In this way, a user who passes the attention verification test will be deemed to be able to pay sufficient attention to the mobile communications device to pass the test and is therefore unlikely to be driving. In this way, users whose mobile communications device is equipped with the application implementing the method of the invention and who are travelling at speed but who are not driving will not be subjected to limited functionality. This is particularly useful for passengers in a car, train or the like. The attention verification test may be a test of user reaction speed, user reaction accuracy or a combination thereof such that an appropriate response to the attention verification test may require a certain percentage accuracy within a preset period.

In another embodiment of the invention there is provided a method in which the method comprises the further step of, if an inappropriate user response is received, presenting a further attention verification test to the user via the user interface after a preset delay has expired. In this way, during the delay period, no user-initiated user interaction with the mobile communications device is possible until the next attention verification test is presented. This should encourage a driver to desist in attempting to use the mobile communications device.

In a further embodiment of the invention there is provided a method further comprising the step of increasing the time period of the preset delay if a further inappropriate user response is received. In this way, a user who repeatedly fails the attention verification test will be locked out of the mobile communications device for increasingly longer periods of time, thus ensuring minimal interaction between the user, presumed to be a driver, and the mobile communications device.

In another embodiment of the invention there is provided a method in which the attention verification test comprises a plurality of sub-tests. In this way, the attention verification test may comprise a series of tests or tasks to be accomplished.

In a further embodiment of the invention there is provided a method in which an appropriate user response comprises a plurality of responses received within a preset time limit. This is a particularly convenient and accurate way of testing mobile communications device user attention.

In an alternative embodiment of the invention there is provided a method in which the step of limiting the functionality of the mobile communications device comprises the SAT application substantially monopolizing the user interface. In this way, the user cannot access the functionality of the phone as he cannot access the interface to that functionality.

In one embodiment of the invention there is provided a method in which the step of limiting the functionality of the mobile communications device comprises limiting user-initiated functionality. In this way, incoming communications on the mobile communications device such as phone calls may be accessed by the user.

DRAWINGS

Figure 2:
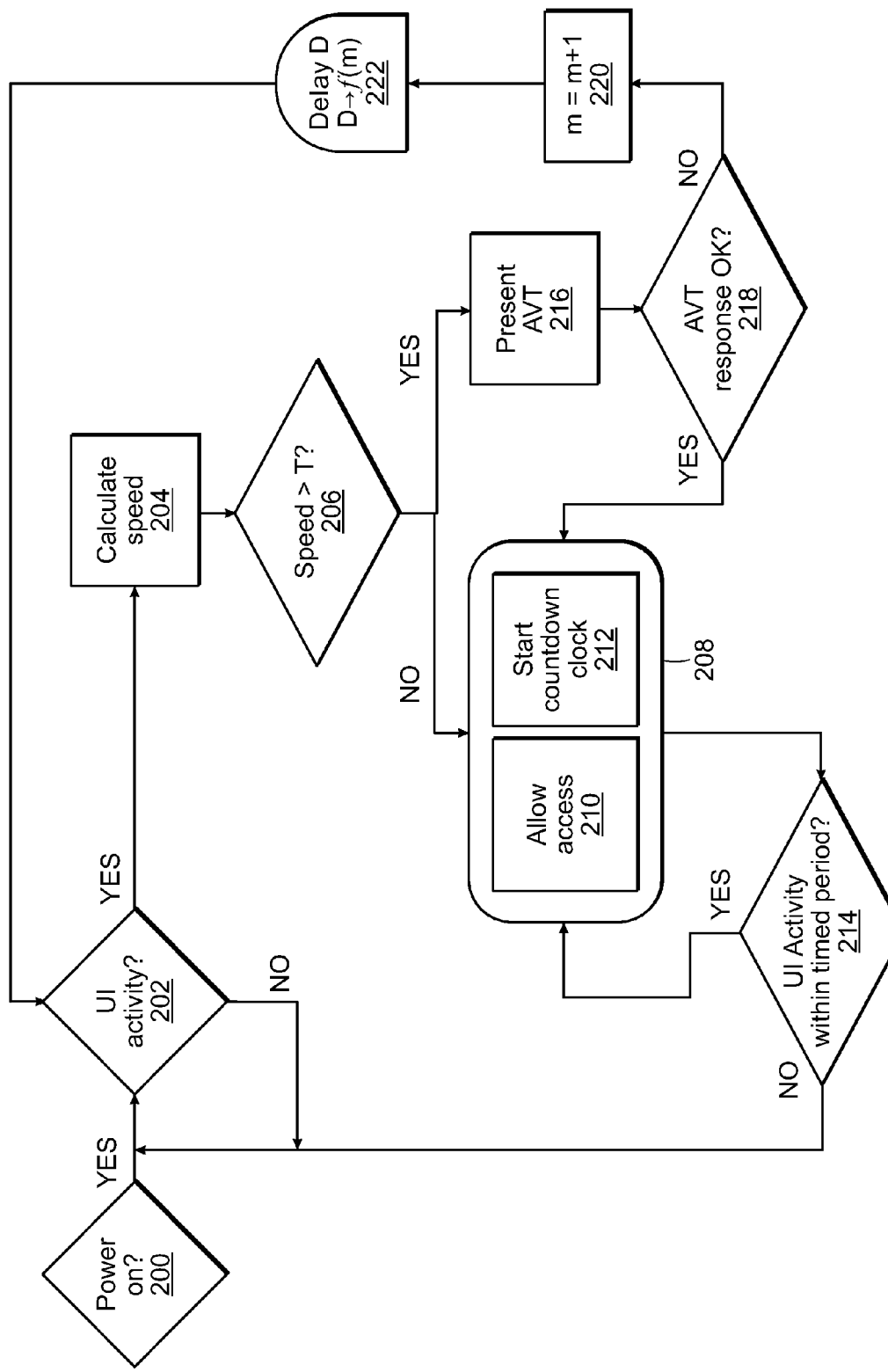

The invention will now be more clearly understood from the following description of an embodiment thereof given by way of example only with reference to the accompanying drawings in which:

FIG. 1 is a block diagram of a mobile communications device adapted to implement the method of the invention; and FIG. 2 is a flow chart of the method of the invention.

DETAILED DESCRIPTION OF THE INVENTION

Referring to the drawings, and initially to FIG. 1 thereof, there is shown a mobile communications device indicated generally by the reference numeral 100, in which the method of the invention may be implemented. The mobile communications device 100 comprises a Subscriber Identity Module (SIM) 102 and a user interface 104. The SIM 102 further comprises memory 106 and a processor 108. The user interface comprises a display 110 and a data entry unit 112. The user interface 104 may comprise a unitary interface such as a touch-screen, wherein the display 110 and data entry unit 112 are combined, or may comprise a separate display 110 and data entry unit 112. It will be understood that the mobile communications device 100 may comprise additional components such as a Power Supply Unit (PSU) and radio unit but these are not shown for the sake of clarity.

The application 114 to implement the method of the invention is stored in the SIM memory 106 and is executed by a SIM operating system (not shown) on the SIM processor 108.

Referring now to FIG. 2, in which like parts have been given the same reference numerals as before, there is shown a flowchart of the method of the invention. In step 200, the method detects that the mobile communications device 100 is powered on, and then, in step 202, begins to monitor the user interface 104 for input from the user. If no user input is detected, the method continues to monitor until user input is detected. When user input is detected, the method proceeds to step 204 where the speed at which the mobile communications device 100 is moving is calculated. Next in step 206, the calculated speed is compared to a preset threshold speed. An exemplary threshold speed is set above a range of nineteen and twenty kmph (equivalent to 12 mph). Many runners may equal or exceed that speed for at least short periods of time, so the range is minimum. If the mobile communications device 100 is moving below the threshold speed, the method moves to step 208 comprising two sub-steps, the first sub-step 210, the method allows the user to access the full functionality of the mobile communications device 100. In the second sub-step 212, the method begins a countdown clock for a predetermined period of time. Typically, this period of time is about fifteen seconds but may be longer or shorter. In step 214, the application 114 monitors the user interface 104 for activity during the countdown period. If user activity is detected, the method returns to step 210, including resetting the countdown timer. If no activity is detected for the countdown timer period the method returns to step 202, where user input is monitored, and when present, the method proceeds to step 204 to check the speed at which the mobile communications device 100 is moving. In this way, if a user is continually using their mobile communications device, their usage will not be interrupted by the application. In this situation, the term continually implies interaction with the data entry unit at least once within each countdown period of the countdown clock of step 212.

Returning now to step 206, if the speed is above the preset threshold, the mobile communications device 100 is deemed to be moving in a vehicle and the method proceeds to check, in step 216, if the user is permitted to access the full functionality of the mobile communications device 100. Step 216 comprises presenting the user with an Attention Verification Test (AVT) by way of the display 110 of the user interface 104 and receiving a response from the user by way of the data entry unit 112. In step 218, the method checks if the user response is adequate to prove that the user is paying sufficient attention to the mobile communications device 100. If the user passes the AVT, the method passes to step 210, allowing the user access to the full functionality of the mobile communications device 100 before returning to step 202. If the user does not pass the AVT, the method moves to step 220 where a count of the number of failed AVTs is incremented before the method moves to step 22 where a delay, which is a dependent on the failed AVT count, is implemented before the method returns to step 202. In this way, if the user fails to provide a suitable response to the AVT, she will have to wait for a period of time until she is presented with another AVT. In the waiting period, she will not have access to the functionality of the mobile communications device. The waiting period gets longer each time the user fails the AVT. The failed AVT count may be reset if the user passes an AVT or if the mobile communications device has been moving at a speed below the threshold speed for a preset period.

Referring now to step 200, the mobile communications device 100 may inform the SIM operating system of its capabilities on start up. A class n terminal, as defined according to ETSI Standard 102.223, will inform the SIM operating system on start-up of its support for geographical location reporting. Once the mobile communications device 100 is powered on, the application 114 notifies the SIM operating system that an action must be performed as soon as the SIM operating system has started-up. The SIM operating system then requests that a Proactive Command is sent as soon as a request is received from the mobile communications device 100. An exemplary Proactive Command comprises a response "91XX" to the first command sent to the SIM operating system by the mobile communications device 100. The mobile communications device 100 then uses a FETCH command to retrieve the Proactive Command from the SIM operating system.

Referring now to step 202, the application 114 monitors the user interface using the GET INPUT Proactive Command until the mobile communications device is turned off. When the user presses a key on the data entry unit 112, the mobile communications device returns the response to the GET INPUT Proactive Command to the SIM.

Referring now to step 204, the speed at which the mobile communications device 100 is travelling may be calculated in a number of different ways, depending on the functionality of the mobile communications device 100. From step 200, the SIM operating system is aware of the capabilities of the mobile communications device 100 with regards to geographical location reporting and the application 114 tailors the Proactive Command to that capability. The SIM itself may incorporate a GPS receiver in which case the SIM application 114 requests the geographical information directly from the SIM-based GPS receiver. There are three possible Pro-active Commands that may be presented by the application 114 to the mobile communications device 100, depending on the class of mobile communications device. In the case of a class n mobile communications device, the mobile communications device comprises a GPS application (not shown) to provide GPS information on the mobile communications device. In this case the Proactive Command is GEOGRAPHICAL LOCATION REQUEST with parameters indicating the requirement for speed measurements. The speed information (or an error message) is subsequently sent back to the application 114 on the SIM using the ENVELOPE command GEOGRAPHICAL LOCATION REPORTING.

In the case of class e mobile communications device, the Proactive Command is OPEN CHANNEL, which relates to a packet data service bearer. Once a packet data service is opened, the mobile communications device informs the application 114. The application 114 then uses the SEND DATA Proactive Command to send a request for location information to a Mobile Location Centre (MLC) and the RECEIVE DATA Proactive Command to receive the speed information back from the MLC. The data sent and received using these commands may be according to the 3GPP standard TS 23.271 for Uplink Time Difference of Arrival (U-TDOA) measurements. The 3GPP standard includes details on the data that needs to be sent to and received from an MLC to support getting location information using the UTDOA method.

For mobile communications devices that are neither class e nor class n, but are able to run SIM applications using the SIM Application Toolkit, the Proactive Command used is SEND SHORT MESSAGE. An SMS message is sent requesting the speed of the user equipment from a location server. In this case the information is sent back from the location server via an SMSPP data download short message.

Referring now to step 216, the application 114 uses a series of DISPLAY TEXT and GET INPUT Proactive Commands to present the user with a sequence of characters and to receive the user's response thereto. The DISPLAY TEXT command causes a message to the user to be displayed on the display 110 requesting that the user enter a specific character, generally a digit, using the data entry unit 112. The application 114 then retrieves the entered character using the GET INPUT command. In order to enter a valid response, the user's response must be the correct character and must be entered within a specific time period. As part of this step 216, the application 114 will maintain a pair of timers (not shown) to control how long each character is displayed on the display 110 and to verify that the user has entered a response within the required time. Typically, each character is displayed for approximately 0.5 seconds, and the user response must be received within 2 seconds but each of these timings may vary.

Throughout the method, the step of limiting the user's access to the mobile communications device comprises the application 114 monopolizing the user interface 104, in particular the display 110, of the mobile communications device such that the user cannot use the user interface to access the functionality. If the button or menu option to create a text message is not visible, then the user cannot select it. The step of monopolizing the user interface comprises using the DISPLAY TEXT Proactive Command to display a message on the display 110. This is combined with a timer to control how long the message is displayed, and thus how long the functionality of the mobile communication device is limited. It is possible that a series of DISPLAY TEXT commands may be required to ensure the user interface 104 is monopolized for the required period of time.

When the method of the invention is allowing a user full access to the mobile communications device, the application 114 does not monopolies the user interface. It interacts therewith using the GET INPUT Proactive Command to monitor the user interaction with the device, and continues to monitor the speed of the mobile communications device, but the application is operating in the background and the user is not aware of it.

In an optional alternative method according to the invention, the user is presented with a question, between steps 206 and 216, asking if they are currently the driver of the vehicle. If the user answers that they are the driver, then the application 114 will limit their access to the functionality of the mobile communications device 100. If the user answers that they are not a driver, the method proceeds to step 216.

The application 114 that implements the method of the invention may be installed on the mobile communications device 100 in one of two ways. The first option is to carry out the installation at the personalization of the mobile communications device 100. The term personalization will be understood to refer to the process of entering mobile network operator specific information, SIM Application Toolkit applications and other SIM specific information on the SIM. This is in general carried out at manufacture or prior to the SIM being made live on the communications network. Personalization is normally carried out by the SIM manufacturer but may also be carried out by a third party or by a network operator. It is possible for the full personalization of the mobile communications device to take place in a number of stages with one or more stages being carried out by a different party. Loading the application 114 can be carried out at any stage in the personalization process, for example at a Point-Of-Sale location. In this way the owner of the mobile communications device, who may be different to the user thereof, may choose to install the application for implementing the method of the invention on purchase of the mobile communications device.

Alternatively the application 114 may be installed on the mobile communications device after it has been purchased, by transmission over the mobile communications network. 3GPP and ETSI standards specify protocols and procedures necessary to enable a SIM Application Toolkit application to be downloaded to a SIM remotely using the Short Message Service. The mobile operator who issues the SIMs must know the keys required to authorize the download and have a platform which can pack the application into the required amount of properly formatted short messages.

The GSM standard is rapidly displacing its competing standard, CDMA 2000. However, in North America, many wireless carriers operate on the a code division multiple access standard, CDMA2000, to send and receive voice, text and other data transmissions. CDMA cell phones do not have a SIM card so the software application 114 of the SIM card cannot not be part of a CDMA handset. Nevertheless, CDMA cell phones have the ability receive, to store and execute software applications. New CDMA cell phone can be manufactured with built-in anti-texting program 114 or its equivalent. For CDMA cell phones already in use, the service provider may push an anti-texting software program 114 or its equivalent to its served cell phone. The push can be made at any time, with or without the permission of the cell phone user. For example, a state government or the federal government could mandate that all cell phone users download the required anti-texting software by an selected activation date. If a user fails to download the software, texting and other faculties of the cell phone could be disabled by the cell phone carrier until the cell phone user downloads the anti-texting software. The push could also be made with GSM/3G/LTE systems. After the activation date, the cell phone carrier would query each cell phone seeking access to its cell service and would deny all service or limit service to only voice transmissions if the cell phone seeking service did not respond positively to the query about the presence and operation of anti-texting software. As an alternative, the anti-texting software could be automatically downloaded to CDMA cell phones without notice to the cell phone owner.

The same network transmission download process can also be used to send configuration changes or upgrades, such as changes to the various timings or the speed threshold, to the application 114 after installation. However, such upgrades and changes are controlled by the network and not the user.

The invention may be implemented with any mobile phone that carries a GPS receiver, including SIM-card phones, CDMA phones and other phones with GPS receivers. The basic operation is as follows. An anti-texting vendor provides a link to a mobile phone. The vendor may be a mobile carrier, an independent vendor, an enterprise that provides mobile phones to its members, or an internet service provider who provides email, browsing and ancillary services to mobile phone users. The link may be provided the phone user via an email or an SMS message, or a posting on a web site. When the phone user accepts the link, the anti-texting program is downloaded and installed on the mobile phone. The anti-texting program may be based on speed measured by the GPS receiver carried on the phone.

Some recent studies have shown that any use of a mobile phone while driving may increase the likelihood of accidents. In addition to preventing a driver from texting during driving, the invention may inhibit all use of the mobile phone. In effect, the phone would not be available for phone calls including and not limited to hands free operation, email, browsing, display of photos or videos, playing music, accessing contacts or any of the thousands of applications currently available for smart phones.

The invention provides a feature that disables all use of the phone when the phone is moving. The anti-texting program has a global inhibiting function which requires the GPS receiver to be turned on as a prerequisite for using any feature of the mobile phone. If the GPS receiver is off and the user attempts to use the phone, the display on the phone provides the user with a menu option to turn on the GPS receiver. If the user does not turn on the GPS receiver, the phone is inoperable. Once the GPS receiver is turned on, the mobile phone operates normally. Of course, if the mobile phone is moving, the anti-texting software will prevent all use of the phone. This global inhibiting function may be used in combination with the driver testing feature to enable a passenger in a moving vehicle to freely use all features of the phone.

In the specification the terms 'comprise', 'comprises', 'comprised' and 'comprising' or any variation thereof and the terms 'include', 'includes', 'included' or 'including' or any variation thereof are considered to be totally interchangeable and they should all b afforded the widest possible interpretation.

The invention is not limited to the embodiment herein described, but may be varied in both construction and detail within the terms of the claims.

The invention claimed is:

1. A method for limiting the use of a mobile communications device, the mobile communications device comprising a user interface, the steps of the method comprising: determining the physical speed at which the mobile communications device is travelling; comparing the physical speed to a preset threshold speed; limiting the functionality of the mobile communications device if the physical speed thereof is above preset threshold speed, presenting a first attention verification test to a user via the user interface; receiving a first user response to said first attention verification test via the user interface; and presenting a second attention verification test to said user via the user interface for a second user response after a delay has expired when said first user response fails said first attention verification test.

2. The method as claimed in claim 1 in which the method comprises the additional step of: restoring the functionality of the mobile communications device if an appropriate user response is received.

3. The method as claimed in claim 1 further comprising the step of increasing the time period of the preset delay if a further inappropriate user response is received.

4. The method as claimed in claim 1 in which the first attention verification test comprises a plurality of sub-tests.

5. The method as claimed in claim 2 in which an appropriate user response comprises a plurality of responses received within a preset time limit.

6. The method as claimed in claim 1 in which the step of limiting the functionality of the mobile communications device comprises an SAT application substantially monopolizing the user interface.

7. The method as claimed in claim 1 in which the step of limiting the functionality of the mobile communications device comprises limiting user-initiated functionality.

8. A method for limiting the use of a mobile communications device equipped with a global positioning service (GPS) receiver, the mobile communications device comprising a user interface, the steps of the method comprising: determining whether the GPS receiver on the mobile communications device is on or off and limiting the functionality of the mobile communications device if the GPS receiver is off;
   determining the physical speed at which the mobile communications device is traveling;
   comparing the physical speed to a preset threshold speed;
   limiting the functionality of the mobile communications device if the physical speed thereof is above preset threshold speed;
   presenting a first attention verification test to a user via the user interface;
   receiving a first user response to said first attention verification test via the user interface; and
   presenting a second attention verification test to said user via the user interface for a second user response after a delay has expired when said first user response fails said first attention verification test.

9. The method as described in claim 8 wherein the mobile communications device is entirely disabled until the GPS receiver is turned on.

10. A method for limiting the use of a mobile communications device, the mobile communications device comprising a user interface, the steps of the method comprising: determining the physical speed at which the mobile communications device is travelling; comparing the physical speed to a preset threshold speed; limiting the functionality of the mobile communications device if the physical speed thereof is above preset threshold speed by a SIM Application Tool Kit (SAT) application running on a Subscriber Identity Module (SIM) of said mobile communications device so as to prevent a user from over-riding said method, wherein said SAT application running on said SIM is inaccessible by said user; presenting a first attention verification test to a user via the user interface; receiving a first user response to said first attention verification test via the user interface; and presenting a second attention verification test to said user via the user interface for a second user response after a delay has expired when said first user response fails said first attention verification test.

11. The method of claim 10, further comprising the step of restoring the functionality of the mobile communications device if an appropriate user response is received.

12. The method of claim 10, further comprising the step of increasing the time period of the preset delay if a further inappropriate user response is received.

* * * * *

UNITED STATES PATENT AND TRADEMARK OFFICE
CERTIFICATE OF CORRECTION

| | |
|---|---|
| PATENT NO. | : 9,060,072 B2 |
| APPLICATION NO. | : 13/331256 |
| DATED | : June 16, 2015 |
| INVENTOR(S) | : Hynes et al. |

It is certified that error appears in the above-identified patent and that said Letters Patent is hereby corrected as shown below:

On the title page, (56) References Cited – Foreign Patent Documents please change [EP 0833293 A1 4/1998] to --EP 0833293 B1 4/1998--

On page 2, (56) References Cited – U.S. Patent Documents please change [2009/0149168 A1 6/2009 McLean] to --2009/0149468 A1 6/2009 Cao--

On page 2, (56) References Cited – Foreign Patent Documents please add:
--KR 20110041908 A 4/2011-- and --KR 2010050275 A 5/2011--

In the specification

In Column 1, line 25, please change [posses] to --possess--

In Column 8, line 2, please change [b] to --be--

Signed and Sealed this
Twentieth Day of October, 2015

Michelle K. Lee
*Director of the United States Patent and Trademark Office*